United States Patent
Anderson et al.

(10) Patent No.: US 9,250,944 B2
(45) Date of Patent: Feb. 2, 2016

(54) SELECTION OF VIRTUAL MACHINES FROM POOLS OF PRE-PROVISIONED VIRTUAL MACHINES IN A NETWORKED COMPUTING ENVIRONMENT

(75) Inventors: Jason L. Anderson, San Jose, CA (US); Gregory J. Boss, Saginaw, MI (US); Jeffrey L. Coveyduc, San Jose, CA (US); Christopher W. Roach, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 13/220,879

(22) Filed: Aug. 30, 2011

(65) Prior Publication Data

US 2013/0055251 A1 Feb. 28, 2013

(51) Int. Cl.
G06F 9/50 (2006.01)
G06F 9/38 (2006.01)
G06F 9/455 (2006.01)

(52) U.S. Cl.
CPC .......... G06F 9/45558 (2013.01); G06F 9/5077 (2013.01); *G06F 2009/4557* (2013.01); *G06F 2209/5011* (2013.01)

(58) Field of Classification Search
CPC ... G06F 9/5077; G06F 9/4558; G06F 9/4557; G06F 2009/5011
See application file for complete search history.

(56) References Cited

U.S. PATENT DOCUMENTS 5,093,912 A 3/1992 Dong et al.
5,317,726 A 5/1994 Horst (Continued)

FOREIGN PATENT DOCUMENTS

CN 101290583 A 10/2008
CN 101894047 A 11/2010
EP 0362107 A2 4/1990
WO 2009108344 A1 9/2009
WO 2012087104 A1 6/2012

OTHER PUBLICATIONS

Zhu, J. et al, "Twinkle: A Fast Resource Provisioning Mechanism for Internet Services", Zhenxiao.com, pp. 1-9. No publication date cited.
Maitland, J., "Keeping Control Isn't Easy", Chapter 4: Cloud-Based Infrastructure, SearchCloudComputing.com, 13 pages.
Mell et al., "The NIST Definition of Cloud Computing", National Institute of Standards and Technology, Information Technology Laboratory, Version 15, Oct. 7, 2009, 2 pages.

(Continued)

*Primary Examiner* — Van Nguyen
*Assistant Examiner* — Melissa Alfred
(74) *Attorney, Agent, or Firm* — Noah A. Sharkan; Hunter E. Webb; Keohane & D'Alessandro PLLC

(57) ABSTRACT

Embodiments of the present invention provide a set of algorithmic methods that can be used to select which partially and/or pre-provisioned virtual machines (VMs) should be used as a base platform to satisfy a new workload (e.g., provisioning) request received in a networked computing environment (e.g., a cloud computing environment). Specifically, when a workload request is received, a set (e.g., at last one) of software programs needed to process the workload request is identified. Then, a set of VMs is selected from a pool of pre-provisioned VMs having the set of software programs. In general, multiple methods and/or factors can be followed to select the set of VMs. Examples include a length of time to install the set of VMs, a probability of the set of VMs being in demand, and/or or a quantity of the set of VMs having the set of software programs. Once the set of VMs has been selected, the set of VMs may be installed, and the workload request can be processed using the set of software programs.

19 Claims, 6 Drawing Sheets

(56) References Cited

U.S. PATENT DOCUMENTS

| | | | |
|---|---|---|---|
| 6,006,223 | A | 12/1999 | Agrawal et al. |
| 6,076,133 | A | 6/2000 | Brainard et al. |
| 6,115,640 | A | 9/2000 | Tarumi |
| 6,374,227 | B1 | 4/2002 | Ye |
| 6,577,323 | B1 | 6/2003 | Jamieson et al. |
| 6,625,577 | B1 | 9/2003 | Jameson |
| 6,856,845 | B2 | 2/2005 | Fromherz et al. |
| 6,966,033 | B1* | 11/2005 | Gasser et al. ............... 715/738 |
| 7,516,457 | B2 | 4/2009 | Eilam et al. |
| 7,558,864 | B2 | 7/2009 | Kalantar et al. |
| 7,577,722 | B1 | 8/2009 | Khandekar et al. |
| 7,636,764 | B1 | 12/2009 | Fein et al. |
| 7,636,779 | B2 | 12/2009 | Hayashi et al. |
| 7,680,770 | B1 | 3/2010 | Buyukkokten et al. |
| 7,809,831 | B2 | 10/2010 | Matsumitsu et al. |
| 7,817,794 | B2 | 10/2010 | Galvin |
| 8,024,433 | B2 | 9/2011 | Mason et al. |
| 8,069,161 | B2 | 11/2011 | Bugir et al. |
| 8,135,795 | B2 | 3/2012 | Birkestrand et al. |
| 8,171,485 | B2 | 5/2012 | Muller |
| 8,180,922 | B2 | 5/2012 | Dini et al. |
| 8,286,183 | B2 | 10/2012 | Baird et al. |
| 8,463,902 | B2 | 6/2013 | Shafiee et al. |
| 8,533,103 | B1 | 9/2013 | Certain et al. |
| 8,826,289 | B2 | 9/2014 | Muller |
| 2002/0165892 | A1 | 11/2002 | Grumann et al. |
| 2003/0167405 | A1 | 9/2003 | Freund et al. |
| 2004/0030882 | A1 | 2/2004 | Forman |
| 2006/0143359 | A1 | 6/2006 | Dostert et al. |
| 2006/0159014 | A1 | 7/2006 | Breiter et al. |
| 2006/0167984 | A1 | 7/2006 | Fellenstein et al. |
| 2006/0225079 | A1 | 10/2006 | Nayak et al. |
| 2007/0214455 | A1 | 9/2007 | Williams et al. |
| 2007/0294676 | A1 | 12/2007 | Mellor et al. |
| 2008/0059972 | A1 | 3/2008 | Ding et al. |
| 2008/0201711 | A1 | 8/2008 | Amir |
| 2008/0244579 | A1 | 10/2008 | Muller |
| 2008/0263553 | A1* | 10/2008 | Lueck et al. ............... 718/102 |
| 2009/0276771 | A1 | 11/2009 | Nickolov et al. |
| 2009/0282404 | A1* | 11/2009 | Khandekar et al. ............... 718/1 |
| 2009/0288084 | A1 | 11/2009 | Asete et al. |
| 2009/0300210 | A1 | 12/2009 | Ferris |
| 2009/0327471 | A1 | 12/2009 | Astete et al. |
| 2010/0058349 | A1* | 3/2010 | Diwakar et al. ............... 718/104 |
| 2010/0131385 | A1 | 5/2010 | Harrang et al. |
| 2010/0138830 | A1 | 6/2010 | Astete et al. |
| 2010/0180272 | A1 | 7/2010 | Kettler et al. |
| 2010/0199285 | A1 | 8/2010 | Medovich |
| 2010/0269109 | A1 | 10/2010 | Cartales |
| 2010/0274890 | A1 | 10/2010 | Patel et al. |
| 2010/0287281 | A1 | 11/2010 | Tirpak |
| 2010/0325191 | A1 | 12/2010 | Jung et al. |
| 2011/0029672 | A1 | 2/2011 | Agneeswaran |
| 2011/0072138 | A1* | 3/2011 | Canturk et al. ............... 709/226 |
| 2011/0138047 | A1 | 6/2011 | Brown et al. |
| 2011/0145153 | A1 | 6/2011 | Dawson et al. |
| 2011/0145392 | A1 | 6/2011 | Dawson et al. |
| 2011/0202925 | A1 | 8/2011 | Banerjee et al. |
| 2011/0246596 | A1 | 10/2011 | Cao et al. |
| 2012/0042061 | A1* | 2/2012 | Ayala et al. ............... 709/224 |
| 2012/0096158 | A1 | 4/2012 | Astete et al. |
| 2012/0137002 | A1 | 5/2012 | Ferris et al. |
| 2013/0024507 | A1 | 1/2013 | Lifshits |
| 2013/0143669 | A1 | 6/2013 | Muller |
| 2013/0159501 | A1 | 6/2013 | Meier et al. |
| 2013/0166621 | A1 | 6/2013 | Zhu |
| 2013/0185729 | A1 | 7/2013 | Vasic et al. |
| 2013/0191542 | A1 | 7/2013 | Matczynski et al. |
| 2013/0205027 | A1 | 8/2013 | Abuelsaad et al. |
| 2013/0238805 | A1 | 9/2013 | Catrein et al. |

OTHER PUBLICATIONS

Song Shan, Information Materials for IDS, SIPO Office Action Dated Aug. 29, 2014, 4 pages.
U.S. Appl. No. 13/227,261, Office Action, Nov. 21, 2012, 15 pages.
U.S. Appl. No. 13/227,261, Office Action, Jan. 16, 2014, 20 pages.
U.S. Appl. No. 13/227,261, Office Action, Jun. 5, 2014, 14 pages.
U.S. Appl. No. 13/227,261, Office Action, Feb. 28, 2013, 17 pages.
U.S. Appl. No. 13/181,646, Office Action, Dec. 13, 2012, 17 pages.
U.S. Appl. No. 13/181,646, Office Action, Jun. 23, 2014, 12 pages.
U.S. Appl. No. 13/181,646, Office Action, Jul. 25, 2014, 14 pages.
U.S. Appl. No. 13/181,646, Office Action, Jun. 25, 2013, 17 pages.
Chieu et al., Dynamic Scaling of Web Applications in a Virtualized Cloud Computing Environment, ICEBE 2009, pp. 281-286.
Alessandro Potenza, UK Combined Search and Examination Report, Oct. 10, 2012, Application No. GB1210253.9, 5 pages.
Pant, P., "Provisioning in the Cloud with Point-and-Click Simplicity Using Your Existing Data Center Tools", cloudswitch.com/blog/tag/new, Jan. 11, 2011, 4 pages.
U.S. Appl. No. 13/214,454, Office Action, Mar. 28, 2014, 32 pages.
U.S. Appl. No. 13/214,454, Office Action, Apr. 2, 2013, 40 pages.
U.S. Appl. No. 13/214,454, Office Action, Oct. 21, 2013, 33 pages.
Ravid, "Practical Statistics for Educators", Oct. 2010, Rowman & Littlefield Publishers, Inc., 26 pages.
U.S. Appl. No. 13/195,326, Office Action, Jul. 3, 2013, 22 pages.
U.S. Appl. No. 13/195,326, Notice of Allowance, Apr. 24, 2014, 28 pages.
Zhu, J. et al, "Twinkle: A Fast Resource Provisioning Mechanism for Internet Services", Zhenxiao.com, INFOCOM, 2011, pp. 1-9.
Maitland, J., "Keeping Control Isn't Easy", Chapter 4: Cloud-Based Infrastructure, SearchCloudComputing.com, Publication date: Oct. 2009, 17 pages.
Xu et al., Multi-objective Virtual Machine Placement in Virtualized Data Center Environments, Dec. 2010, IEE Computer Society, Proceedings of the 2010 IEEE/ACM Int'l Conference on Green Computing and Communications & Int'l Conference on Cyber, Physical and social Computing, pp. 178-188.
Mell et al., "The NIST Definition of Cloud Computing", National Institute of Standards and Technology, Information Technology Laboratory, Version 15, Oct. 2009, 2 pages.
U.S. Appl. No. 13/214,454, Office Action dated Dec. 22, 2014, 33 pages.
U.S. Appl. No. 13/181,646, Notice of Allowance dated Sep. 30, 2014, 12 pages.
U.S. Appl. No. 13/227,261, Notice of Allowance dated Jan. 16, 2015, 10 pages.
U.S. Appl. No. 13/425,509, Office Action dated Oct. 25, 2013, 17 pages.
U.S. Appl. No. 13/425,509, Office Action dated May 22, 2014, 13 pages.
U.S. Appl. No. 13/425,509, Office Action dated Sep. 25, 2014, 18 pages.
U.S. Appl. No. 13/425,509, Office Action dated Jan. 8, 2015, 16 pages.
U.S. Appl. No. 13/195,326, Office Action dated Oct. 25, 2013, 20 pages.

* cited by examiner

US 9,250,944 B2

SELECTION OF VIRTUAL MACHINES FROM POOLS OF PRE-PROVISIONED VIRTUAL MACHINES IN A NETWORKED COMPUTING ENVIRONMENT

TECHNICAL FIELD

In general, the present invention relates to the selection of virtual machines (VMs) in a networked computing environment (e.g., a cloud computing environment). Specifically, the present invention relates to the selection of VMs from pre-provisioned pools of VMs to process workload requests.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, storage devices, among others.

Cloud computing services are typically rendered within a relatively static hardware pool whereby operating systems and applications are deployed and reconfigured to meet the computational demands of consumers. Within the cloud environment's boundaries, application images can be installed and overwritten, Internet Protocol (IP) addresses may be modified, and real and virtual processors may be allocated to meet changing business needs. Presently, different cloud service providers may take varying amounts of time to provision virtual machines requested by consumers. For example, some cloud providers may provision a particular resource in a matter of seconds, while others may take hours. The differences in provisioning speeds are generally caused by at least three factors: the type of storage architecture, the architecture of the cloud management platform, and/or the methods used to provision resources. As such, challenges can exist in achieving efficient computing resource provisioning times.

SUMMARY

Embodiments of the present invention provide a set of algorithmic methods that can be used to select which partially and/or pre-provisioned virtual machines (VMs) should be used as a base platform to satisfy a new workload (e.g., provisioning) request received in a networked computing environment (e.g., a cloud computing environment). Specifically, when a workload request is received, a set (e.g., at last one) of software programs needed to process the workload request is identified. Then, a set of VMs is selected from a pool of pre-provisioned VMs having the set of software programs. In general, multiple methods and/or factors can be followed to select the set of VMs. Examples include a length of time to install the set of VMs, a probability of the set of VMs being in demand, and/or or a quantity of the set of VMs having the set of software programs. Once the set of VMs has been selected, the set of VMs may be installed, and the workload request can be processed using the set of software programs.

A first aspect of the present invention provides a computer-implemented method for selecting pre-provisioned virtual machines (VMs) to process workload requests in a networked computing environment, comprising: receiving a workload request in a computer storage media; identifying a set of software programs needed to process the workload request; selecting a set of VMs from a pool of pre-provisioned VMs having the set of software programs in the networked computing environment, the set of VMs being selected based on at least one of the following: a length of time to install the set of VMs; a probability of the set of VMs being in demand, or a quantity of the set of VMs having the set of software programs; installing the set of VMs; and processing the workload request using the set of software programs in the set of VMs.

A second aspect of the present invention provides a system for selecting pre-provisioned virtual machines (VMs) to process workload requests in a networked computing environment, comprising: a memory medium comprising instructions; a bus coupled to the memory medium; and a processor coupled to the bus that when executing the instructions causes the system to: receive a workload request in a computer storage media; identify a set of software programs needed to process the workload request; select a set of VMs from a pool of pre-provisioned VMs having the set of software programs in the networked computing environment, the set of VMs being selected based on at least one of the following: a length of time to install the set of VMs; a probability of the set of VMs being in demand, or a quantity of the set of VMs having the set of software programs; install the set of VMs; and process the workload request using the set of software programs in the set of VMs.

A third aspect of the present invention provides a computer program product for selecting pre-provisioned virtual machines (VMs) to process workload requests in a networked computing environment, the computer program product comprising a computer readable storage media, and program instructions stored on the computer readable storage media, to: receive a workload request in a computer storage media; identify a set of software programs needed to process the workload request; select a set of VMs from a pool of pre-provisioned VMs having the set of software programs in the networked computing environment, the set of VMs being selected based on at least one of the following: a length of time to install the set of VMs; a probability of the set of VMs being in demand, or a quantity of the set of VMs having the set of software programs; install the set of VMs; and process the workload request using the set of software programs in the set of VMs.

A fourth aspect of the present invention provides a method for deploying a system for selecting pre-provisioned virtual machines (VMs) to process workload requests in a networked computing environment, comprising: deploying computer infrastructure being operable to: receive a workload request in a computer storage media; identify a set of software programs needed to process the workload request; select a set of VMs from a pool of pre-provisioned VMs having the set of software programs in the networked computing environment, the set of VMs being selected based on at least one of the following: a length of time to install the set of VMs; a probability of the set of VMs being in demand, or a quantity of the set of VMs having the set of software programs; install the set of VMs; and process the workload request using the set of software programs in the set of VMs.

BRIEF DESCRIPTION OF THE DRAWINGS

These and other features of this invention will be more readily understood from the following detailed description of the various aspects of the invention taken in conjunction with the accompanying drawings in which.

Figure 1:
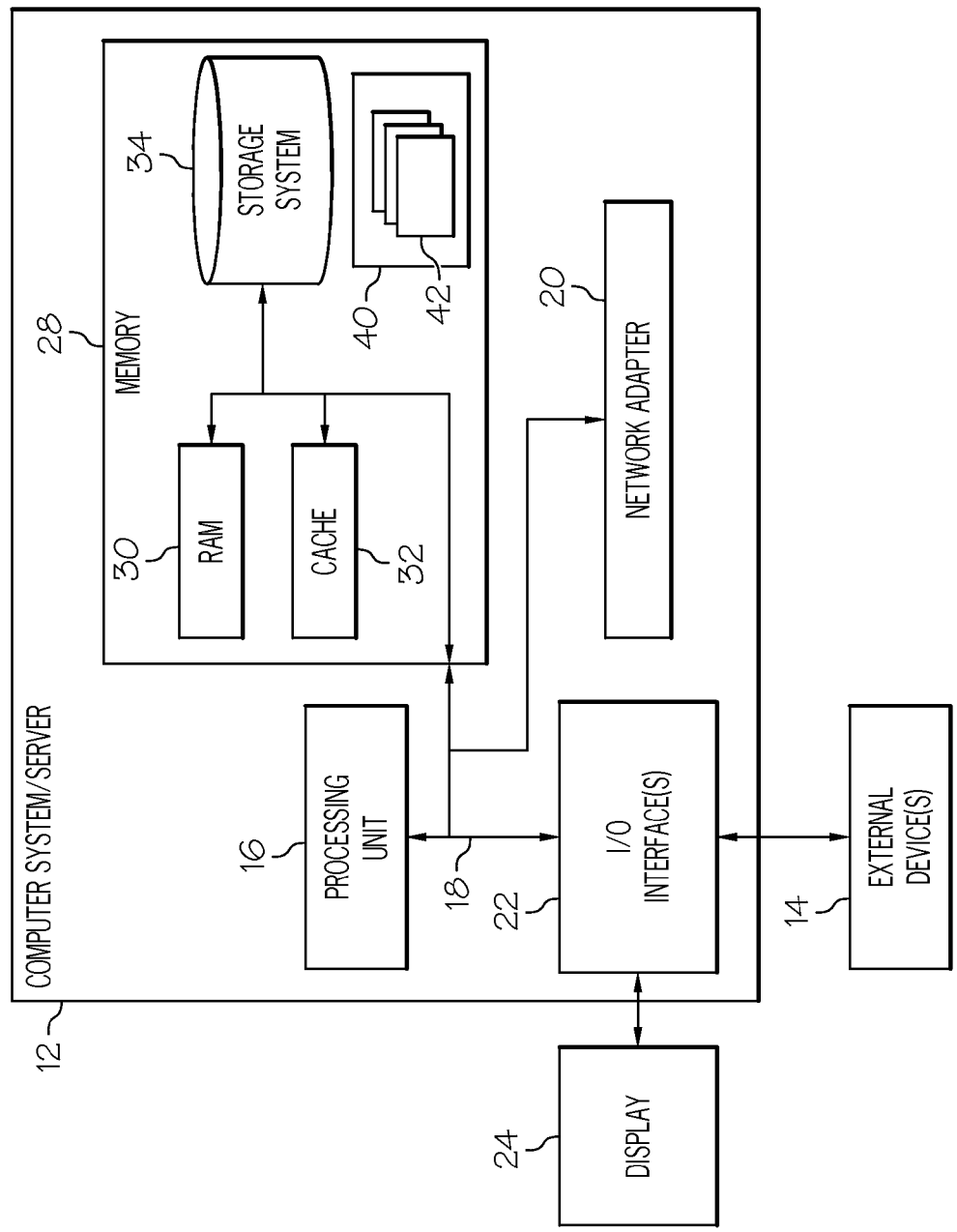
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide a set of algorithmic methods that can be used to select which partially and/or pre-provisioned virtual machines (VMs) should be used as a base platform to satisfy a new workload (e.g., provisioning) request received in a networked computing environment (e.g., a cloud computing environment). Specifically, when a workload request is received, a set (e.g., at last one) of software programs needed to process the workload request is identified. Then, a set of VMs is selected from a pool of pre-provisioned VMs having the set of software programs. In general, multiple methods and/or factors can be followed to select the set of VMs. Examples include a length of time to install the set of VMs, a probability of the set of VMs being in demand, and/or or a quantity of the set of VMs having the set of software programs. Once the set of VMs has been selected, the set of VMs may be installed, and the workload request can be processed using the set of software programs.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
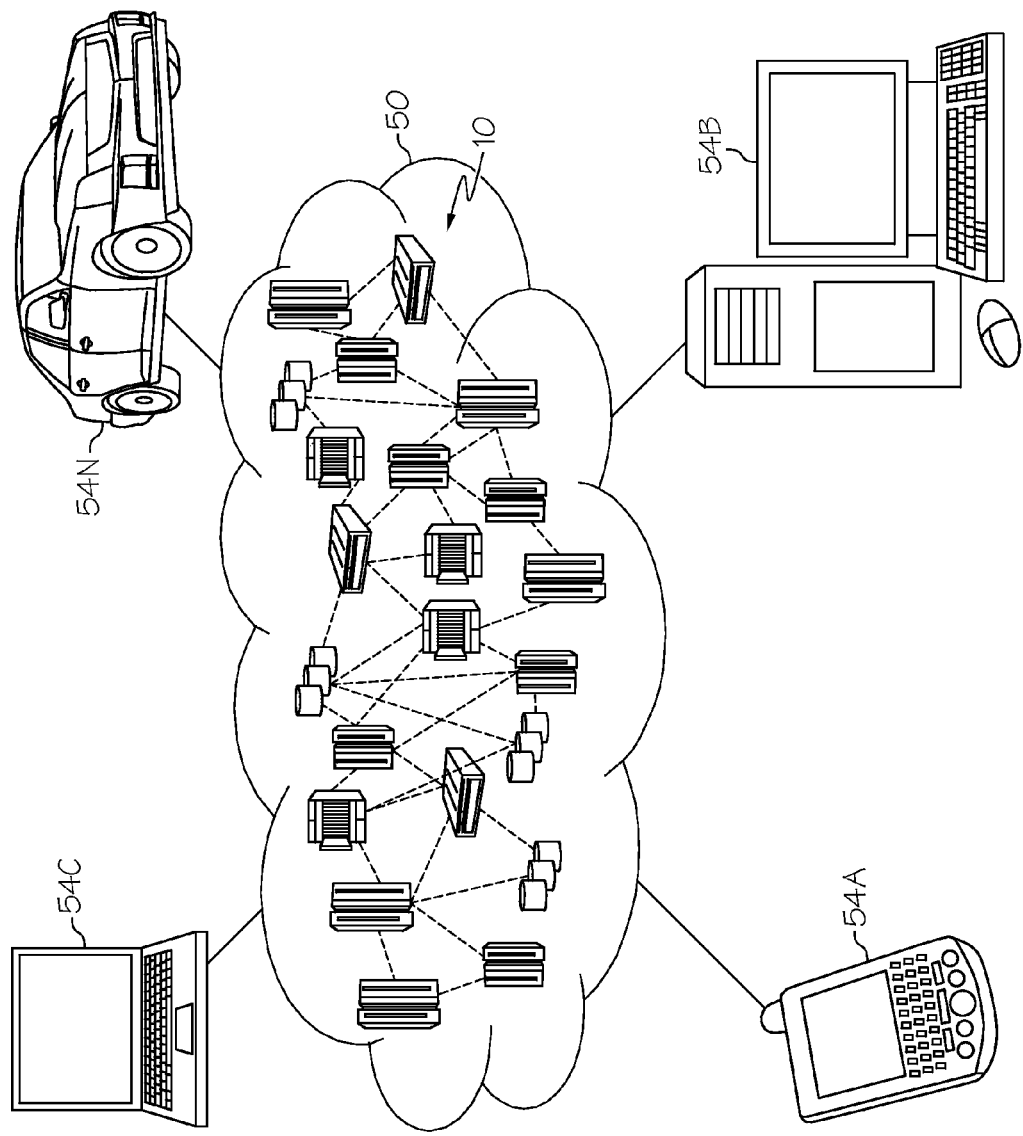
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
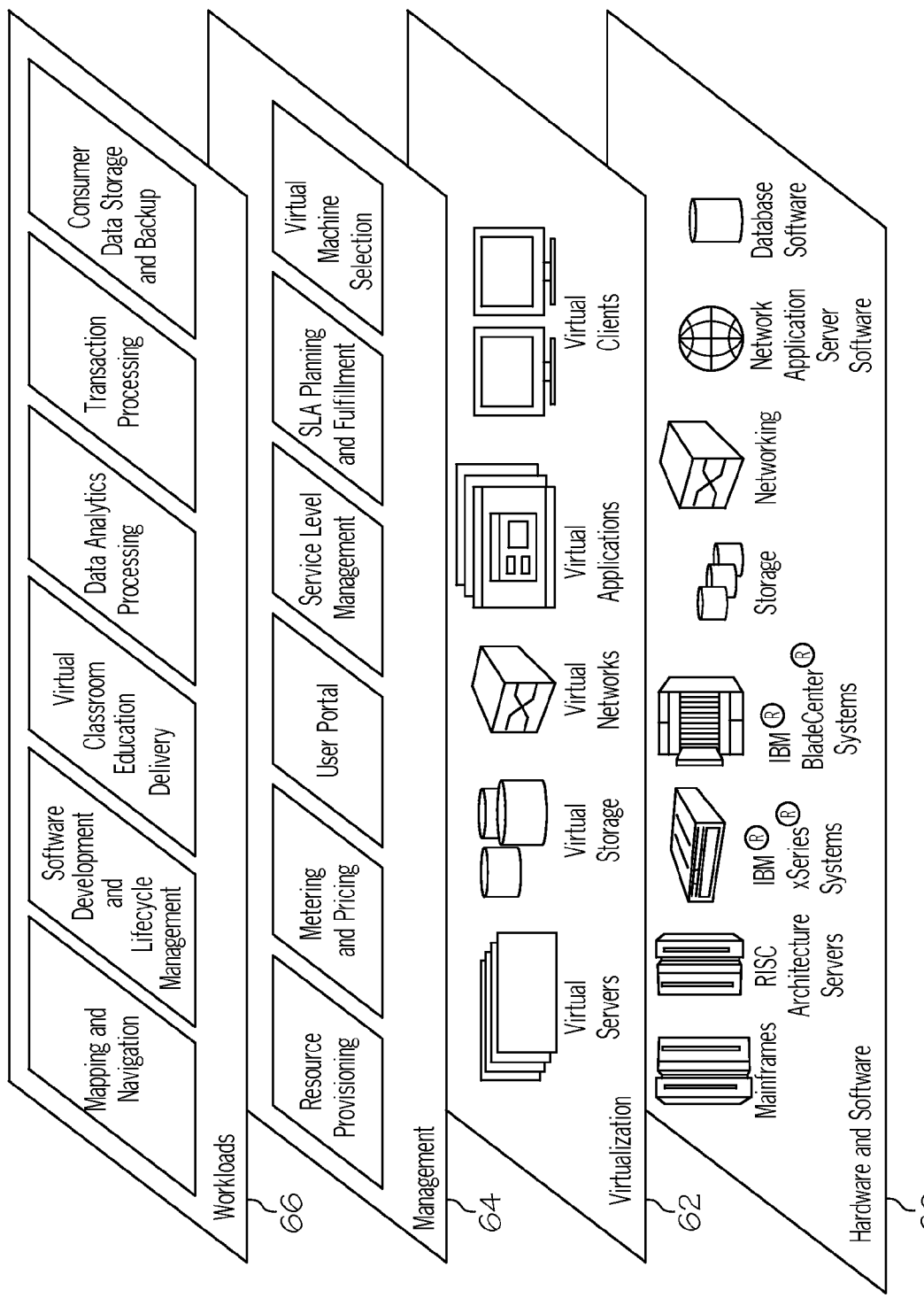
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is virtual machine selection function, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the virtual machine selection functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
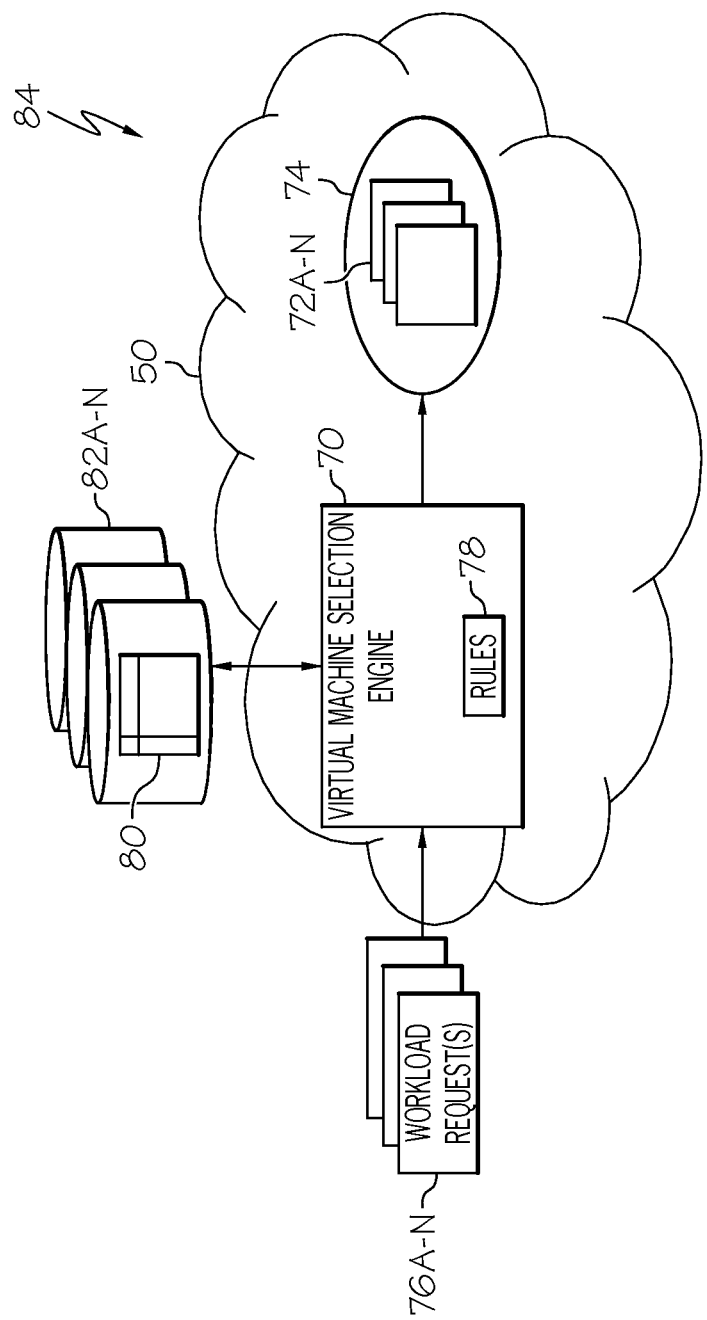
FIG. 4 depicts a system diagram according to an embodiment of the present invention.

Referring now to FIG. 4, a system diagram according to an aspect of the present invention is shown. As depicted, a virtual machine pooling engine (engine 70) is shown within networked computing environment 84 (e.g., comprising cloud computing environment 50). In general, engine 70 can be implemented as program 40 on computer system 12 of FIG. 1 and can implement the functions recited herein as depicted in management layer 64 of FIG. 3. In general, engine 70 (in one embodiment) comprises a rules and/or computational engine that processes a set (at least one) of rules 78 and/or performs a set of computations to select a set of VMs 72A-N from a pool of pre-provisioned VMs (pool 74) to process/handle one or more workload requests 76A-N. Along these lines, engine 70 may perform functions similar to a general-purpose computer Along these lines, engine 70 may perform multiple functions using rules 78. Specifically, among other functions, engine 70 may: receive a workload request in a computer storage media; identify a set of software programs needed to process the workload request; select a set of VMs from a pool of pre-provisioned VMs having the set of software programs in the networked computing environment, the set of VMs being selected based on at least one of the following: a length of time to install the set of VMs; a probability of the set of VMs being in demand, or a quantity of the set of VMs having the set of software programs; install the set of VMs; and process the workload request using set of software programs in the set of VMs.

The functions of engine 70 will now be explained in further detail. Assume cloud environment 50 comprises contains a pool 74 of (e.g., at least partially) pre-provisioned VMs 72A-N. Further assume that some provisioning history and ratings data 80 exists for the partially pre-provisioned images 72A-N (e.g., in a set of databases 82A-N or the like). Under the embodiments of the present invention, there are multiple methods/approaches that can be implemented to identify which VMs 72A-N in pool 74 comprises the software program(s) needed to process workload requests 76A-N. In the example set forth below, it will be assumed that up to three possible software programs are provided and/or are needed, namely, software programs "A", "B", C" (or any combination thereof). However, this need not be the case and it is understood that software programs "A", B", and "C" are cited for illustrative purposes only.

Figure 5:
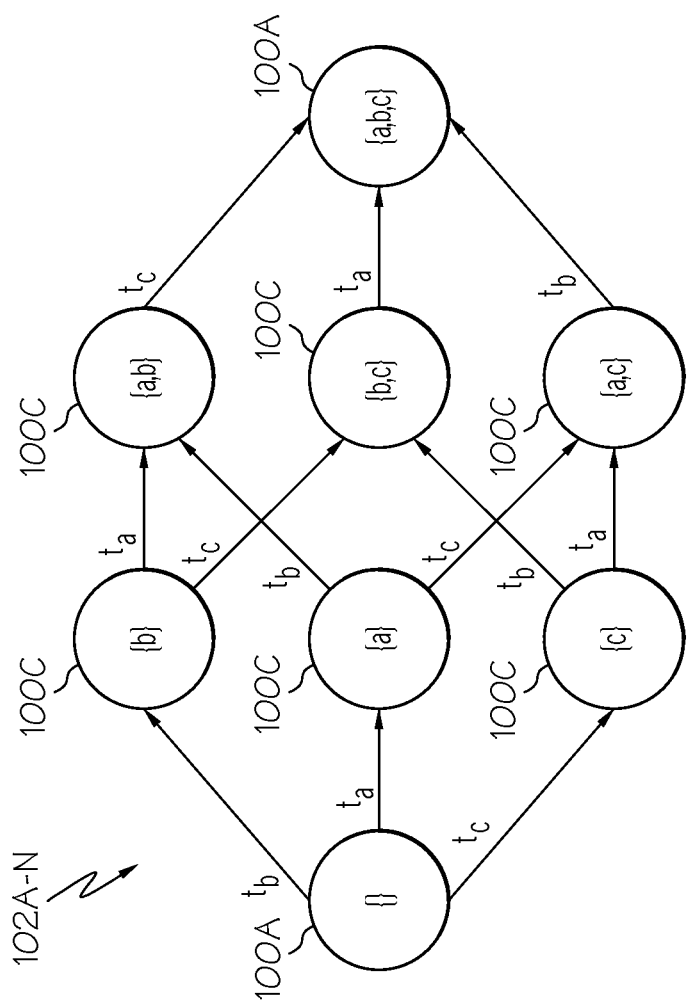
FIG. 5 depicts an install graph according to an embodiment of the present invention.

Method/Approach 1—Selection based on shortest install time: This method comprises an algorithm that determines the partially pre-provisioned VM that will require the shortest time to fulfill the particular workload request. This method could be implemented by looping through all the partially provisioned VMs and selecting the VM that requires the least time. This concept is shown in greater detail in FIG. 5. As depicted, the graph of FIG. 5 shows VMs 100A-N having come combination of software programs "A", "B", and/or "C". Also shown, are various traversal paths 102A-N with associate times "$t_x$" to obtain all three software programs "A", "B", and "C". For example, beginning at VM 100A (null set), one possible route for obtaining all three software programs as shown in node 100N is to traverse path $t_b$ to VM 100B, then path $t_a$ to VM 100E, and then path $t_c$ to VM 100N. As further shown, multiple paths from VM 100A to VM 100N could be followed. Under the time-based method/approach described above, the engine would compute the traverse times for all possible paths, then select the available path with the least cumulative traversal time.

Method/Approach 2—Choose the pre-provisioned VM that has the least probability of being in demand: In this method/approach, engine 70 identifies the VM with the lowest probability of being in demand (P (software combination)) and chooses that software combination VM. This method does not utilize the VMs with a higher probability of being in demand since those VMs will likely be needed for in the near future. This approach would benefit a cloud environment where a workload request is received faster than an associated cloud management system can replenish the partially pre-provisioned pool 74.

Method/Approach 3—Choose the partially pre-provisioned VM that has the highest probability of being in demand: This method is substantially the opposite of method/approach 2 in that engine 70 determines the VM with the highest probability of being in demand (P (software combination)). This method is based on a particular VM having a high P (software combination), which would imply that there is more of them in the pool 74. Consequently there is likely to be more time to replenish the pool 74 with a similar/like VM.

Method 4—Select the software combination (or VM having the software combination) with the highest quantity of partially pre-provisioned VMs. This method examines all the possible starting combinations that do not require starting from a null set (e.g., scratch), and then utilizes the software combination that has the greatest number of partially provisioned VMs. In one illustrative example, VM 1={A} and VM 2={B}. There are also 10 pre-provisioned VM 1's but only 2 pre-provisioned VM 2's. In this situation, method/approach 4 would utilize VM 1 since there is a large supply of VM 1's, and therefore will not compromise the diversity of the pool 74.

Figure 6:
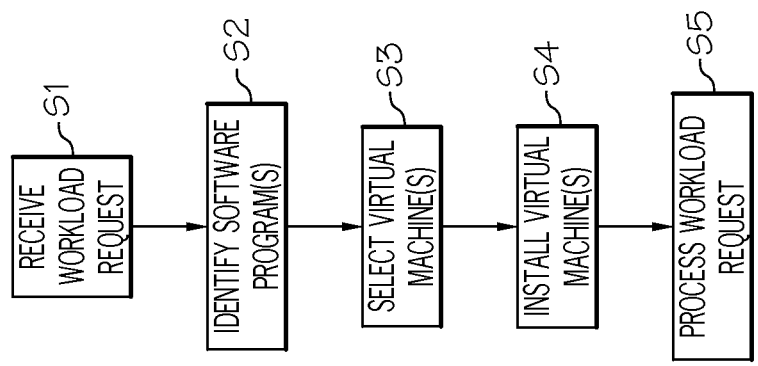
FIG. 6 depicts a method flow diagram according to an embodiment of the present invention.

Referring now to FIG. 6, a method flow diagram according to an embodiment of the present invention is shown. As depicted, in step S1, a workload request is received in a computer storage medium. In step S2, a set of software programs needed to process the workload request is identified. In step S3, a set of VMs is selected from a pool of pre-provisioned VMs having the set of software programs in the networked computing environment. In general, the set of VMs can be selected based on at least one of the following: a length of time to install the set of VMs; a probability of the set of VMs being in demand, or a quantity of the set of VMs having the set of software programs. In step S4, the set of VMs is installed, and in step S5 the workload request is processed using the set of software programs in the set of VMs.

While shown and described herein as a VM selection solution, it is understood that the invention further provides various alternative embodiments. For example, in one embodiment, the invention provides a computer-readable/useable medium that includes computer program code to enable a computer infrastructure to provide VM selection functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide VM selection functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for VM selection. In this case, a computer infrastructure, such as computer system 12 (FIG. 1), can be provided, and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for selecting pre-provisioned virtual machines (VMs) to process workload requests in a networked computing environment, comprising:
   receiving a workload request in a computer storage medium;
   identifying a set of software programs needed to process the workload request;
   selecting a particular set of VMs from a pool of pre-provisioned VMs having the set of software programs in the networked computing environment, the particular set of VMs being selected based on: a length of time to install the set of VMs; a probability of the set of VMs being in demand by other workloads while the workload request is being processed, and the set of VMs having a highest quantity of VMs in the pool that are partially pre-provisioned at a time of the workload request;
   installing the particular set of VMs; and
   processing the workload request using the particular set of software programs in the set of VMs;
   wherein selecting of the set of software programs further comprises:
      looping through all of the pre-provisioned VMs having some combination of the set of software programs;
      calculating times associated with traversal paths for each combination;
      and
      selecting the particular set of VMs based on the shortest time associated with a traversal path indicating a shortest length of time to install the set of VMs.

2. The computer-implemented method of claim 1, the set of software programs being selected based on a lowest probability that the set of VMs will be in demand.

3. The computer-implemented method of claim 1, the set of software programs being selected based on a highest probability that the set of VMs will be in demand.

4. The computer-implemented method of claim 1, the selecting of the set of software programs further comprising:
   examining all possible combinations of the set of software programs that do not require starting from VMs that have not been pre-provisioned; and
   selecting the particular set of VMs based on the set of VMs that have the set of software programs having the highest number of pre-provisioned instances.

5. The computer-implemented method of claim 1, the networked computing environment comprising a cloud computing environment.

6. A system for selecting pre-provisioned virtual machines (VMs) to process workload requests in a networked computing environment, comprising:
   a memory medium comprising instructions;
   a bus coupled to the memory medium; and
   a processor coupled to the bus that when executing the instructions causes the system to:
      receive a workload request in a computer storage media;
      identify a set of software programs needed to process the workload request;
      select a particular set of VMs from a pool of pre-provisioned VMs having the set of software programs in the networked computing environment, the particular set of VMs being selected based on: a length of time to install the set of VMs; a probability of the set of VMs being in demand by other workloads while the workload request is being processed, and the set of VMs having a highest quantity of VMs in the pool that are partially pre-provisioned at a time of the workload request;
      install the particular set of VMs; and
      process the workload request using the particular set of software programs in the set of VMs;
      wherein selecting of the set of software programs further comprises:
         looping through all of the pre-provisioned VMs having some combination of the set of software programs;
         calculating times associated with traversal paths for each combination;
         and
         selecting the particular set of VMs based on the shortest time associated with a traversal path indicating a shortest length of time to install the set of VMs.

7. The system of claim 6, the memory medium further comprising instructions for causing the system to select the set of software programs based on a shortest length of time to install the set of VMs.

8. The system of claim 6, the memory medium further comprising instructions for causing the system to select the set of software programs being selected based on a lowest probability that the set of VMs will be in demand.

9. The system of claim 6, the memory medium further comprising instructions for causing the system to select the set of software programs being selected based on a highest probability that the set of VMs will be in demand.

10. The system of claim 6, the memory medium further comprising instructions for causing the system to select the set of software programs being selected based a highest quantity of set of VMs that have the set of software programs.

11. The system of claim 6, the networked computing environment comprising a cloud computing environment.

12. A computer program product for selecting pre-provisioned virtual machines (VMs) to process workload requests in a networked computing environment, the computer program product comprising a computer readable storage device, wherein the computer readable storage device is not a propagation signal, and program instructions stored on the computer readable storage device, to:
- receive a workload request in a computer storage media;
- identify a set of software programs needed to process the workload request;
- select a particular set of VMs from a pool of pre-provisioned VMs having the set of software programs in the networked computing environment, the particular set of VMs being selected based on: a length of time to install the set of VMs; a probability of the set of VMs being in demand by other workloads while the workload request is being processed, and the set of VMs having a highest quantity of VMs in the pool that are partially pre-provisioned at a time of the workload request;
- install the particular set of VMs; and
- process the workload request using the particular set of software programs in the set of VMs;
- wherein selecting of the set of software programs further comprises:
  - looping through all of the pre-provisioned VMs having some combination of the set of software programs;
  - calculating times associated with traversal paths for each combination;
  - and
  - selecting the particular set of VMs based on the shortest time associated with a traversal path indicating a shortest length of time to install the set of VMs.

13. The computer program product of claim 12, the computer readable storage device further comprising instructions to select the set of software programs based on a shortest length of time to install the set of VMs.

14. The computer program product of claim 12, the computer readable storage device further comprising instructions to select the set of software programs being selected based on a lowest probability that the set of VMs will be in demand.

15. The computer program product of claim 12, the computer readable storage device further comprising instructions to select the set of software programs being selected based on a highest probability that the set of VMs will be in demand.

16. The computer program product of claim 12, the computer readable storage device further comprising instructions to select the set of software programs being selected based a highest quantity of set of VMs that have the set of software programs.

17. The computer program product of claim 12, the networked computing environment comprising a cloud computing environment.

18. A method for deploying a system for selecting pre-provisioned virtual machines (VMs) to process workload requests in a networked computing environment, comprising:
- deploying computer infrastructure being operable to:
  - receive a workload request in a computer storage media;
  - identify a set of software programs needed to process the workload request;
  - select a particular set of VMs from a pool of pre-provisioned VMs having the set of software programs in the networked computing environment, the particular set of VMs being selected based on: a length of time to install the set of VMs; a probability of the set of VMs being in demand by other workloads while the workload request is being processed, and the set of VMs having a highest quantity of VMs in the pool that are partially pre-provisioned at a time of the workload request;
  - install the particular set of VMs; and
  - process the workload request using the particular set of software programs in the set of VMs;
  - wherein selecting of the set of software programs further comprises:
    - looping through all of the pre-provisioned VMs having some combination of the set of software programs;
    - calculating times associated with traversal paths for each combination;
    - and selecting the particular set of VMs based on the shortest time associated with a traversal path indicating a shortest length of time to install the set of VMs.

19. The method of claim 18, the networked computing environment comprising a cloud computing environment.

\* \* \* \* \*